US010209827B1

(12) United States Patent
Malkin et al.

(10) Patent No.: US 10,209,827 B1
(45) Date of Patent: Feb. 19, 2019

(54) DYNAMIC ADJUSTMENT OF DEMODULATION WAVEFORM

(71) Applicant: Apple Inc., Cupertino, CA (US)

(72) Inventors: Moshe Malkin, Palo Alto, CA (US); Shahrooz Shahparnia, Monte Sereno, CA (US); Vivek Pant, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/191,614

(22) Filed: Jun. 24, 2016

(51) Int. Cl.
 *G06F 3/041* (2006.01)
(52) U.S. Cl.
 CPC .................................. *G06F 3/0418* (2013.01)
(58) Field of Classification Search
 CPC ....................................................... G06F 3/045
 See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,031,886 | B1 | 4/2006 | Hargreaves |
| 7,663,607 | B2 | 2/2010 | Hotelling et al. |
| 8,305,352 | B2 | 11/2012 | Wu et al. |
| 8,479,122 | B2 | 7/2013 | Hotelling et al. |
| 10,042,486 | B1 | 8/2018 | Shahparnia |
| 2006/0197753 | A1 | 9/2006 | Hotelling |
| 2007/0257890 | A1 | 11/2007 | Hotelling et al. |
| 2008/0150918 | A1 | 6/2008 | Hagen et al. |
| 2010/0059295 | A1 | 3/2010 | Hotelling et al. |
| 2011/0042152 | A1 | 2/2011 | Wu |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2016/032704 A1 | 3/2016 |

OTHER PUBLICATIONS

Final Office Action dated May 4, 2017, for U.S. Appl. No. 14/515,390, filed Oct. 15, 2014, 21 pages.

(Continued)

*Primary Examiner* — Olga V Merkoulova
(74) *Attorney, Agent, or Firm* — Morrison & Foerster LLP

(57) ABSTRACT

A touch sensing system can demodulate sensor data using a dynamically adjusted demodulation waveform and/or demodulation window. The demodulation waveform and/or demodulation window can be dynamically adjusted to account for dynamically changing noise in a touch sensing system. The system can dynamically adjust the demodulation window based on noise measured by the touch sensing system to generate an optimized or otherwise noise-tailored window to suppress detected noise. In some examples, the noise measured by the touch sensing system can be sampled from sense channels localized to a detected touch.

25 Claims, 11 Drawing Sheets

(56) References Cited

U.S. PATENT DOCUMENTS

| | | | |
|---|---|---|---|
| 2011/0061948 A1* | 3/2011 | Krah | G06F 3/0418 178/18.01 |
| 2011/0063227 A1 | 3/2011 | Wu et al. | |
| 2011/0210939 A1* | 9/2011 | Reynolds | G06F 3/0418 345/174 |
| 2011/0210941 A1 | 9/2011 | Reynolds et al. | |
| 2012/0306801 A1 | 12/2012 | Rai et al. | |
| 2013/0176272 A1* | 7/2013 | Cattivelli | G06F 3/041 345/174 |
| 2014/0267086 A1 | 9/2014 | Yousefpor et al. | |
| 2015/0035797 A1* | 2/2015 | Shahparnia | G06F 3/041 345/174 |

OTHER PUBLICATIONS

Non-Final Office Action dated Aug. 26, 2016, for U.S. Appl. No. 14/515,390, filed Oct. 15, 2014, 18 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Sep. 21, 2017, for U.S. Appl. No. 14/515,390, filed Oct. 15, 2014, 20 pages.

Notice of Allowance dated May 9, 2018, for U.S. Appl. No. 14/515,390, filed Oct. 15, 2014, nine pages.

* cited by examiner

DYNAMIC ADJUSTMENT OF DEMODULATION WAVEFORM

FIELD

This relates generally to demodulation waveforms for touch-sensitive devices and, more specifically, to dynamic adjustment of demodulation waveforms.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Touch-sensitive devices can operate in environments in which the noise profile (or noise characteristics or noise environment) can change dynamically. Noise in the operating environment can degrade touch sensing performance of the touch-sensitive device.

SUMMARY

This relates to dynamically adjusting a demodulation waveform and/or demodulation window to account for dynamically changing noise in a touch sensing system. Rather than using a static demodulation window to generate the demodulation waveform, an optimized or otherwise noise-tailored window function can be used to generate the demodulation waveform. The system can dynamically adjust the demodulation window based on noise measured by the touch sensing system. In some examples, the noise measured by the touch sensing system can be sampled from sense channels localized to a detected touch.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to dynamically adjusting a demodulation waveform and/or demodulation window to account for dynamically changing noise or unknown characteristics of a noise source in a touch sensing system. Rather than using a static demodulation window to generate the demodulation waveform, an optimized or otherwise noise-tailored window function can be used to generate the demodulation waveform. The system can dynamically adjust the demodulation window based on noise measured by the touch sensing system. In some examples, the noise measured by the touch sensing system can be sampled from sense channels localized to a detected touch.

Figure 1A:
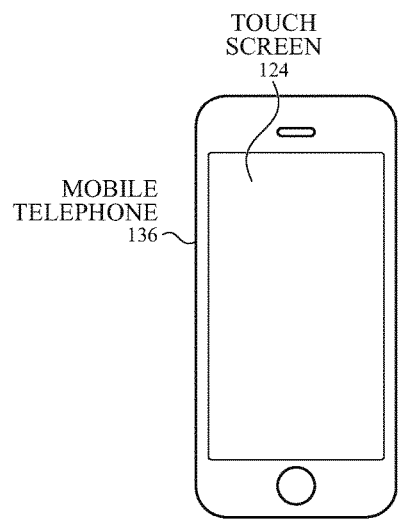
FIGS. 1A-1D illustrate examples of systems with touch screens that can dynamically adjust a demodulation waveform and/or demodulation window according to examples of the disclosure.
Figure 1B:
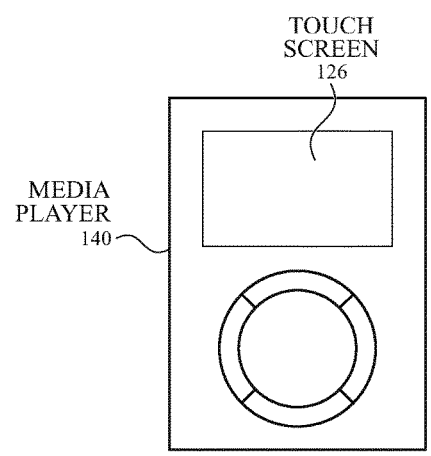
Figure 1C:
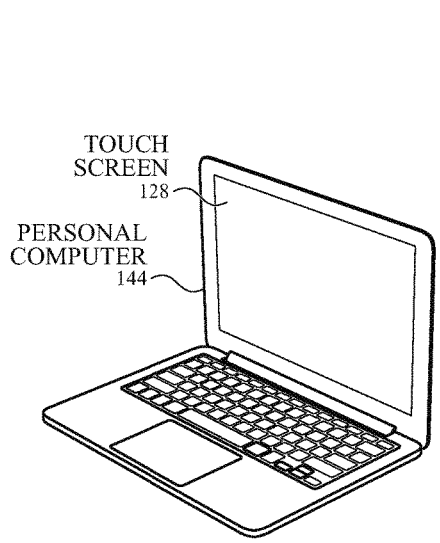
Figure 1D:
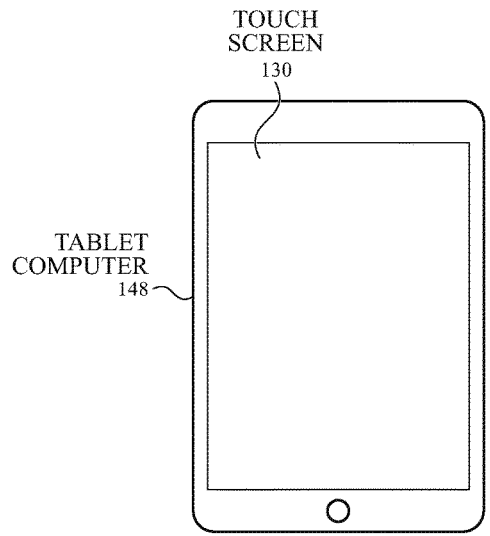

FIGS. 1A-1D illustrate examples of systems with touch screens that can dynamically adjust a demodulation waveform and/or demodulation window according to examples of the disclosure. FIG. 1A illustrates an exemplary mobile telephone 136 that includes a touch screen 124 that can dynamically adjust a demodulation waveform and/or demodulation window according to examples of the disclosure. FIG. 1B illustrates an example digital media player 140 that includes a touch screen 126 that can dynamically adjust a demodulation waveform and/or demodulation window according to examples of the disclosure. FIG. 1C illustrates an example personal computer 144 that includes a touch screen 128 that can dynamically adjust a demodulation waveform and/or demodulation window according to examples of the disclosure. FIG. 1D illustrates an example tablet computing device 148 that includes a touch screen 130 that can dynamically adjust a demodulation waveform and/or or demodulation window according to examples of the disclosure. Other devices, including wearable devices, can dynamically adjust a demodulation waveform and/or demodulation window according to examples of the disclosure. Although often described herein in terms of touch screens, dynamically adjusting a demodulation waveform and/or demodulation window can be performed for touch-sensitive devices that do not include a screen (e.g., a trackpad).

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
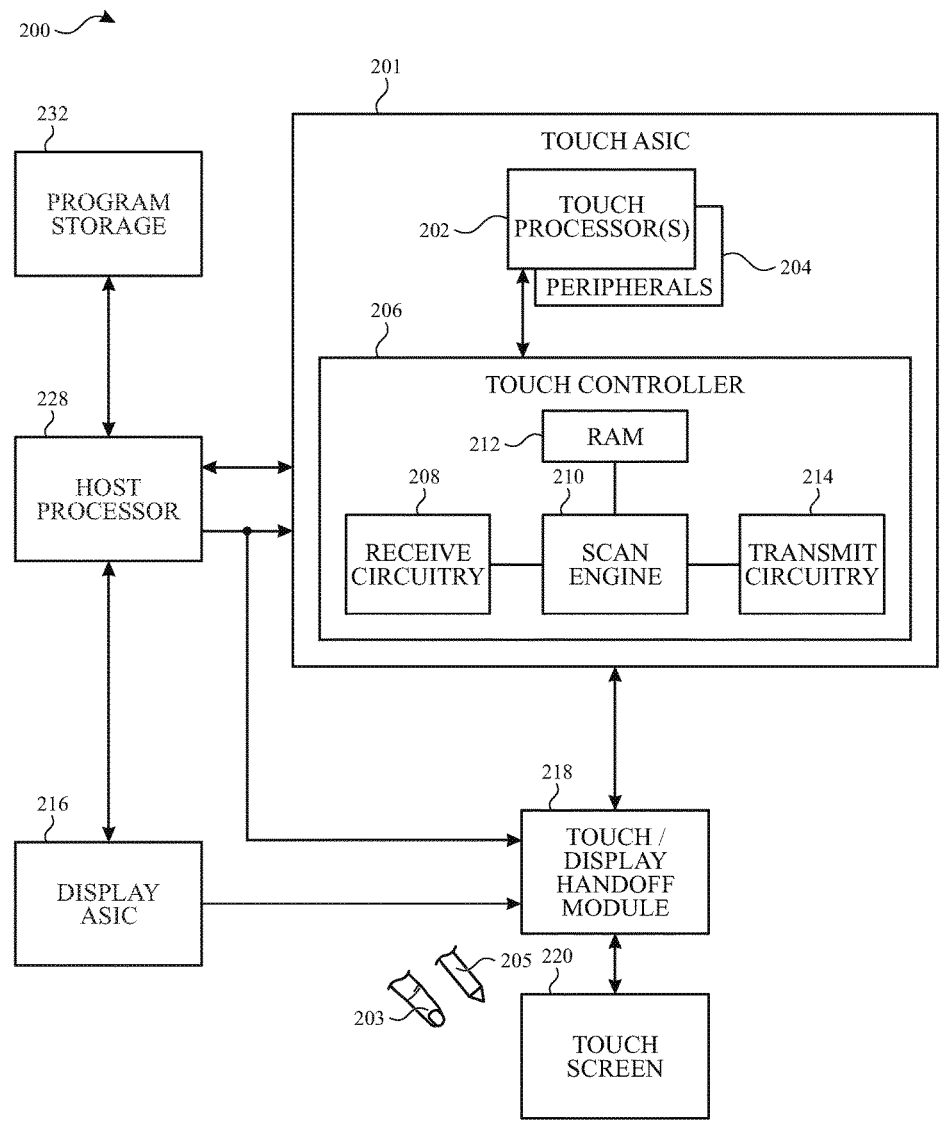
FIG. 2 illustrates a block diagram of an example computing system that can dynamically adjust a demodulation waveform according to examples of the disclosure.

FIG. 2 illustrates a block diagram of an example computing system 200 that can receive input from an object such as a finger or a passive or an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208 (which can include one or more demodulators), panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216). Additionally or alternatively, although various functions are often described herein as performed by a processor, the processor may be implemented with one or more processors, processing circuits or processing units (e.g., dual core processor).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
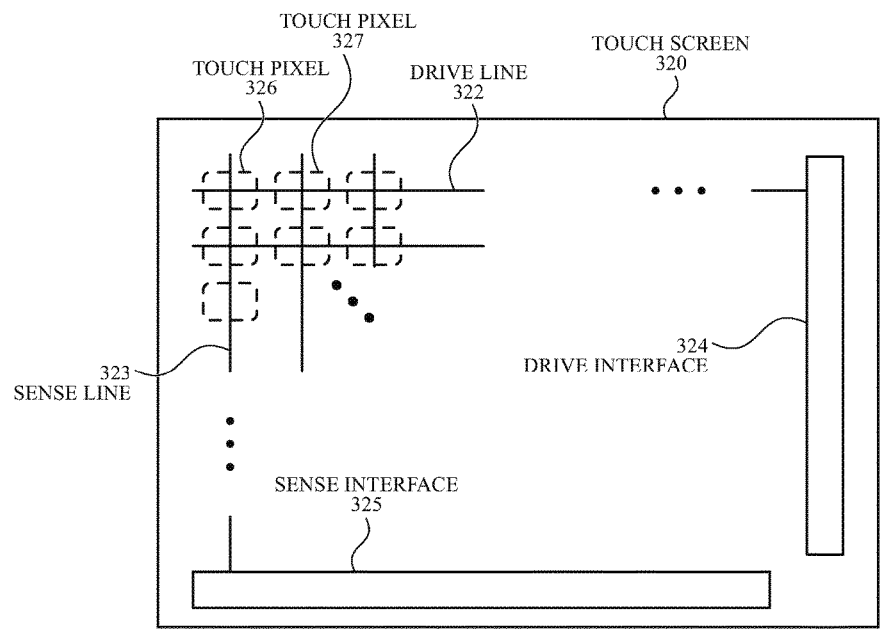
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
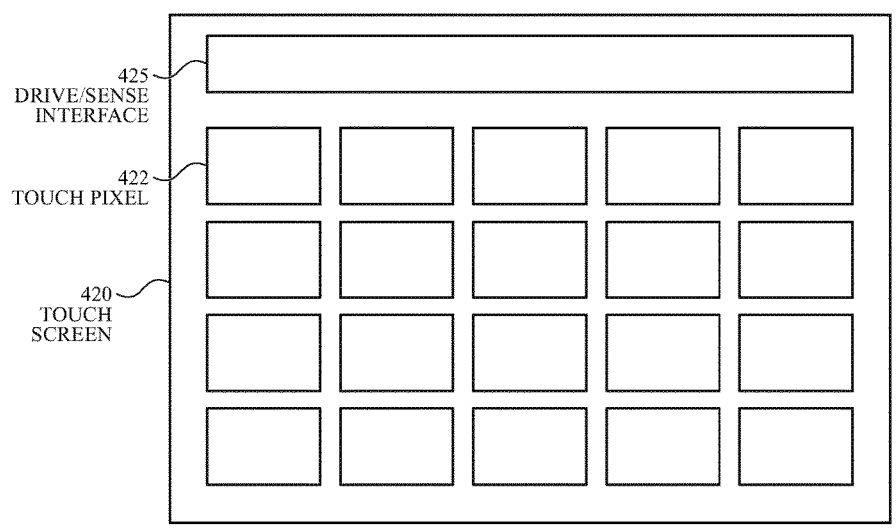
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

As discussed above with reference to FIG. 2, receive circuitry 208 can include one or more demodulators. The one or more demodulators can demodulate signals from the sense channels with a demodulation waveform. As discussed herein, the demodulation waveform and/or demodulation window can be dynamically adjusted to improve noise rejection for touch sensing systems. In some examples, noise can be sampled and used to adjust the demodulation window (and thereby the demodulation waveform) to the specific noise profile. Adjusting the demodulation window to the specific noise profile can improve rejection of the noise in the identified noise profile.

Figure 5A:
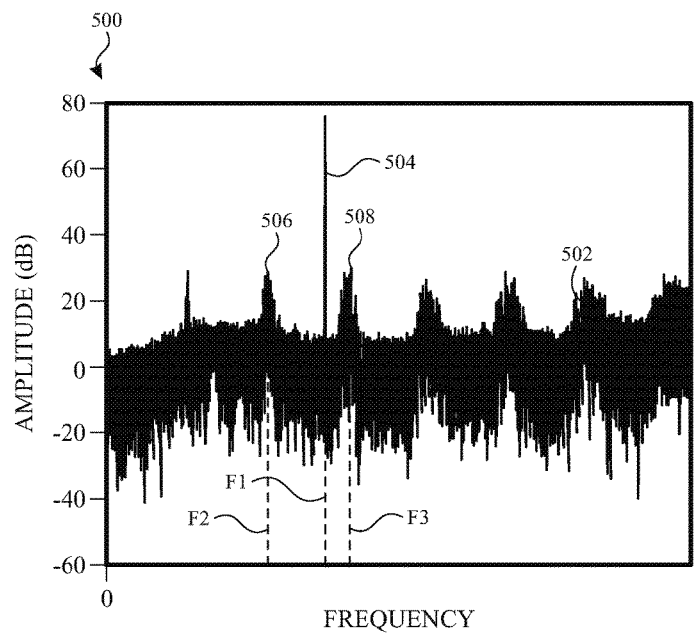
FIGS. 5A and 5B illustrate frequency domain representations of example system noise and example demodulation windows according to examples of the disclosure.
Figure 5B:
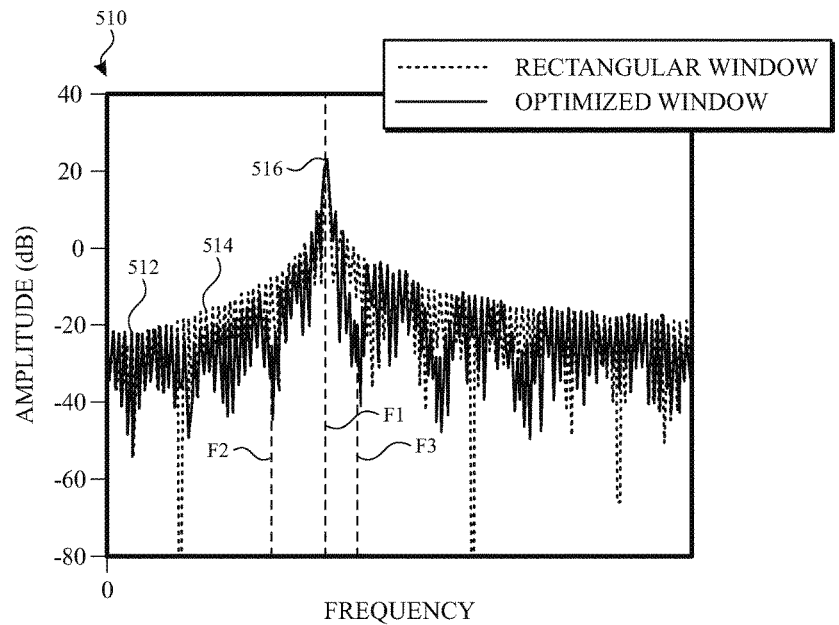

FIGS. 5A and 5B illustrate frequency domain representations of example system noise and example demodulation windows according to examples of the disclosure. FIG. 5A illustrates a frequency domain representation of example system noise according to examples of the disclosure. Plot 500 illustrates the power spectral density of a touch sensing system including a representation of noise 502 and a representation of signal 504. Signal 504 can be located at operating frequency f1 (i.e., a fundamental frequency of the stimulation generated by the transmit circuitry). Noise 502, as represented in plot 500 can include various peaks including peaks 506 and 508 centered around frequencies f2 and f3, for example. It should be understood that the noise 502 represented in FIG. 5A is an example of noise, and that noise can be different than shown. Notably, the noise profile can be dynamic, rather than static. For example, the noise profile can change due to the introduction or removal of noise aggressors such as fluorescent lights or chargers. The noise profile can include white noise and/or one or more narrow-band or broadband tones. Additionally, the aggressor tones time or spectral characteristics can be static, or the noise can dynamically change and produce tones at changing frequencies, for example.

FIG. 5B illustrates a frequency domain representation of example demodulation windows according to examples of the disclosure. Plot 510 illustrates a frequency domain representation of two example demodulation windows, including an optimized demodulation window 512 that can be tailored to a specific noise profile, and a rectangular demodulation window 514. Optimized demodulation window 512 and rectangular demodulation window 514 can include a peak 516 at a frequency corresponding to the operating frequency f1 (fundamental frequency), to pass signals from the touch sensor. However, whereas the amplitude of rectangular demodulation window 514 falls off from peak 516 irrespective of the noise profile, optimized demodulation window 512 can be tailored to further suppress noise at frequencies (or frequency ranges) with increase noise. For example, optimized demodulation window 512 can include notches centered at frequencies f2 and f3, to further attenuate the contributions from peaks in the noise at frequencies f2 and f3 (as compared with rectangular demodulation window 514). Similarly, additional notches in the optimized demodulation window 512 are illustrated corresponding to additional peaks in noise 502. Although, often referred to herein as an optimized demodulation window, it should be understood that the dynamically adjusted demodulation window need not be optimal per se. Instead, the dynamically adjusted demodulation window can tailor the demodulation waveform to improve rejection of dynamically changing noise in the operating environment. However, in some examples, as described in more detail below, the dynamically adjusted demodulation window can be adapted based on optimization principles and based on other constraints placed on the demodulation window optimization that can result in an optimal window subject to the imposed specific system constraints.

Figure 6:
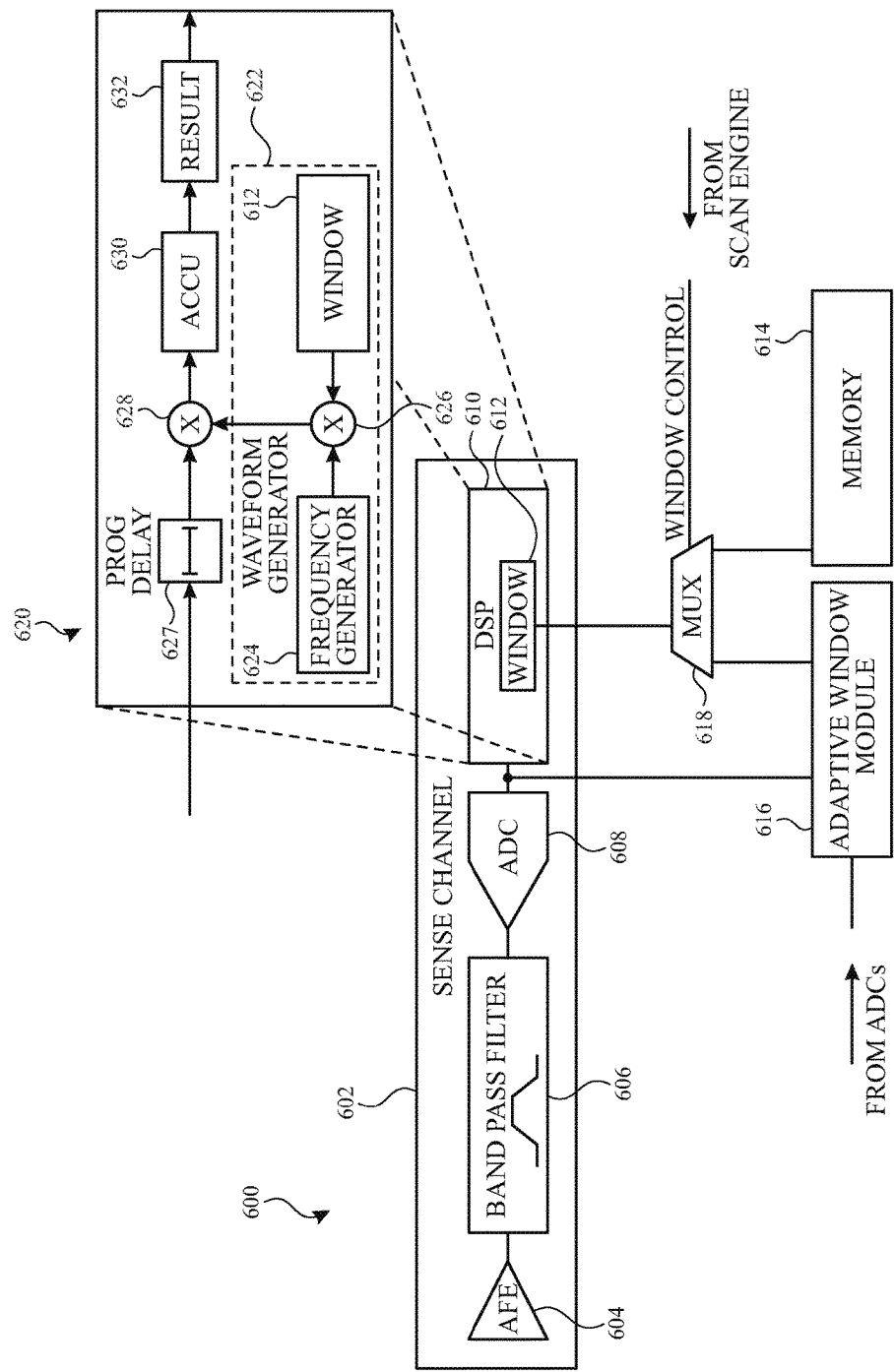
FIG. 6 illustrates a block diagram of an example system for dynamically adjusting a demodulation window according to examples of the disclosure.

FIG. 6 illustrates a block diagram of an example system 600 for dynamically adjusting a demodulation window according to examples of the disclosure. FIG. 6 includes an example sense channel 602, which can be included as part of receive circuitry 208 in FIG. 2 for example. Sense channel 602 can include an analog front end (AFE) 604 (e.g., a transimpedance amplifier), an anti-aliasing filter 606 (e.g., a low pass or band-pass filter), an analog-to-digital converter (ADC) 608, and a digital signal processor (DSP) 610. During scanning operations, a touch sensor node coupled to sense channel 602 can be sensed by AFE 604, filtered by anti-aliasing filter 606 and converted to digital form by ADC 608 for further processing by DSP 610. DSP 610 can include a demodulator 620 configured to perform digital demodulation of the ADC output signals. The demodulator 620 can include a programmable delay 627 (or non-programmable delay) to align the phase of the ADC output with the demodulation waveform, a mixer 628 (e.g., signal multiplier) to mix the ADC output with the demodulation waveform, and an accumulator 630 (e.g., an integrator) to accumulate the output from mixer 628. Although not shown, the accumulated output from the integrator can be scaled, decoded (e.g., in multi-stim touch sensing schemes) to generate result 632 which can be stored in a memory (e.g., RAM 212) for further processing. The demodulation waveform can be generated by waveform generator 622, which can include a frequency generator 624 (e.g., an oscillator), mixer 626 and window 612 (also referred to as demodulation window or window function). Window 612 can provide amplitude shaping for the demodulation waveform according to a mixer function. For simplicity of discussion, demodulation window 612 in DSP 610 is illustrated, and the demodulation waveform based thereon can be mixed with the ADC output to demodulate the ADC output. It should be understood that although DSP 610 is illustrated in FIG. 6 as part of the sense channel, in some examples the sense channel can include ADC 608, but the DSP can be implemented separately from the sense channel. Additionally, although only a single demodulation operation is shown, multiple demodulations and demodulations waveforms could be applied to a single ADC channel output, resulting in multiple simultaneous outputs per sense channel.

In some examples, the demodulation window can be static. In a static system, a static demodulation window can be stored in memory 614. The static demodulation window can be a rectangular window for example (e.g., as illustrated in FIG. 5B). In other examples, the demodulation window can be a Hann window, Hamming window, Tukey window, Blackman window, Taylor window, flat top window, or any other suitable window. In some examples, multiple static demodulation windows can be stored in memory 614, and the system can select one of the multiple static demodulation windows for use in demodulation by DSP 610. For example, memory 614 can include a rectangular window, Hann window and a flat top window, and the system can select which static demodulation window to use based on monitored conditions (e.g., operating frequency, noise profile).

In some examples, an optimized (or otherwise dynamically adjusted to suppress noise) demodulation window can be generated by adaptive window module 616 based on the noise profile of the system, and can be used for demodulation by DSP 610. The optimized demodulation window can be dynamically adjusted by adaptive window module 616 to provide a demodulation window optimized for the existing noise profile. Demodulating the ADC output with an optimized demodulation window can improve performance by better suppressing noise (as compared with the use of static demodulation windows). Adaptive window module 616 can be implemented in hardware, firmware or software, or any combination thereof. In some examples, adaptive window module 616 can be a DSP or a programmable logic device or gate array. In some examples, adaptive window module 616 can be a processor executing a program or instructions stored on a non-transitory processor readable storage medium for adapting the window based on detected noise.

In some examples, as described in more detail herein, the demodulation window (and therefore demodulation waveform) used for demodulation can be dynamically altered by the touch sensing system. FIG. 6 illustrates schematically the ability to select between one or more of these demodulation windows with multiplexer (MUX) 618 (or another switching means). A control signal (e.g., from scan engine 210) can select whether to select the demodulation window from adaptive window module 616 or from a static window from memory 614. In some examples, the adaptive window module 616 can include additional memory to store a demodulation window. In some examples, the adaptive window module 616 can store the dynamically adjusted demodulation window in memory 614 as well for selection by the system.

In some examples, selection of the demodulation window (e.g., according to control signal for MUX 618) can depend on monitored device conditions. The device conditions can include, but are not limited to, power level, noise level, noise profile, scan type and mode of operation. For example, an optimized demodulation window can be used when power is above a threshold value. However, a static window (or different static windows) can be used when the power is below a threshold value, such that the processing required by adaptive window module 616 to generate an optimized demodulation window can be saved. Additionally or alternatively, when the noise level is below a threshold level or the noise profile can be easily demodulated without an optimized window, adaptive window module 616 can be disabled to save power (and static windows can be used). In contrast, when a noisy environment in detected, adaptive window module 616 can be enabled. In some examples, scan results of a scan type with greater noise tolerance (e.g., above threshold noise margin) can be demodulated with a static demodulation window rather than an optimized window. In some examples, use of an optimized window can be enabled when in a mode of operation of the touch-sensitive device that requires improved performance. In some examples implementing adaptive window module 616, the demodulation window can be taken from adaptive window module 616 without consideration of device conditions (in which case, the functionality of MUX 618 and memory 614 can be omitted).

It is to be understood that system 600 is not limited to the components and configuration of FIG. 6, but can include other or additional components in multiple configurations according to various examples. Additionally, the components of computing system 600 can be included within a single device, or can be distributed between multiple devices.

Adaptive window module 616 can receive, as input, the output from one or more sense channels. As illustrated in FIG. 6, adaptive window module 616 can receive output from the ADC 608 of sense channel 602. Additionally, in some examples, adaptive window module 616 can receive additional outputs from other sense channels (not shown). The inputs from one or more sense channels can be used to generate an optimized window (or otherwise noise-tailored window) as described in more detail below.

In some examples, adaptive window module 616 can be implemented outside of sense channel 602 as illustrated in FIG. 6. For example, adaptive window module 616 can be a chip or ASIC that can be integrated into existing touch sensing systems without significant modification to existing sense channels and receive circuitry. In other examples, adaptive window module 616 can be implemented within a sense channel 602. An adaptive window module implemented within the sense channel can share its generated optimized window with the DSPs of each sense channel, for example (e.g., assuming one sense includes the adaptive window module).

In some examples, a system can include multiple adaptive window modules. For example, in some examples, each channel can include a dedicated adaptive window module to generate an optimized window for use by the DSP of the corresponding channel. Thus, DSP 610 of sense channel 602 (or corresponding to sense channel 602) can demodulate output from ADC 608 of sense channel 602 using an optimized window, and a different sense channel (not shown) can have a DSP using a different optimized window to demodulate the output from its ADC. Each adaptive window module can generate a corresponding optimized window based on ADC output from one or more sense channels. In some examples, rather than each sense channel using its own optimized window, an arbitration process (described in more detail below) can be used to select one of the multiple adapted windows generated by the multiple adaptive window modules, and the selected adapted window can be used to generate an optimized window for demodulation by the DSPs corresponding to each sense channel.

As described above, the adaptive window module can use ADC output data from one or more sense channels to adapt a window and/or generate an optimized window. In some examples, the adaptive window module can dynamically select the sense channels to collect ADC output data from in order to adapt a window and/or generate an optimized demodulation window. For example, the selected ADC outputs can be localized to one or more sense channels that measure a touch event by an object. Coupling between an object and the touch sensors can introduce noise into the system not detected elsewhere in a touch sensor panel. The touch-localized ADC output can effectively represent the noise profile for the system. Dynamically selecting sense channels can allow the adaptive window module to use ADC output data representative of the noise profile for the system without using too much data. Using ADC output from fewer channels can simplify the routing and reduce processing requirements for the adaptive window module. Additionally, using data from additional channels can introduce AFE/sampling noise into the adaptive window process (e.g., noise due to the variation between samples due to independent AFE channel noises, rather than environmental noise).

Figure 7:
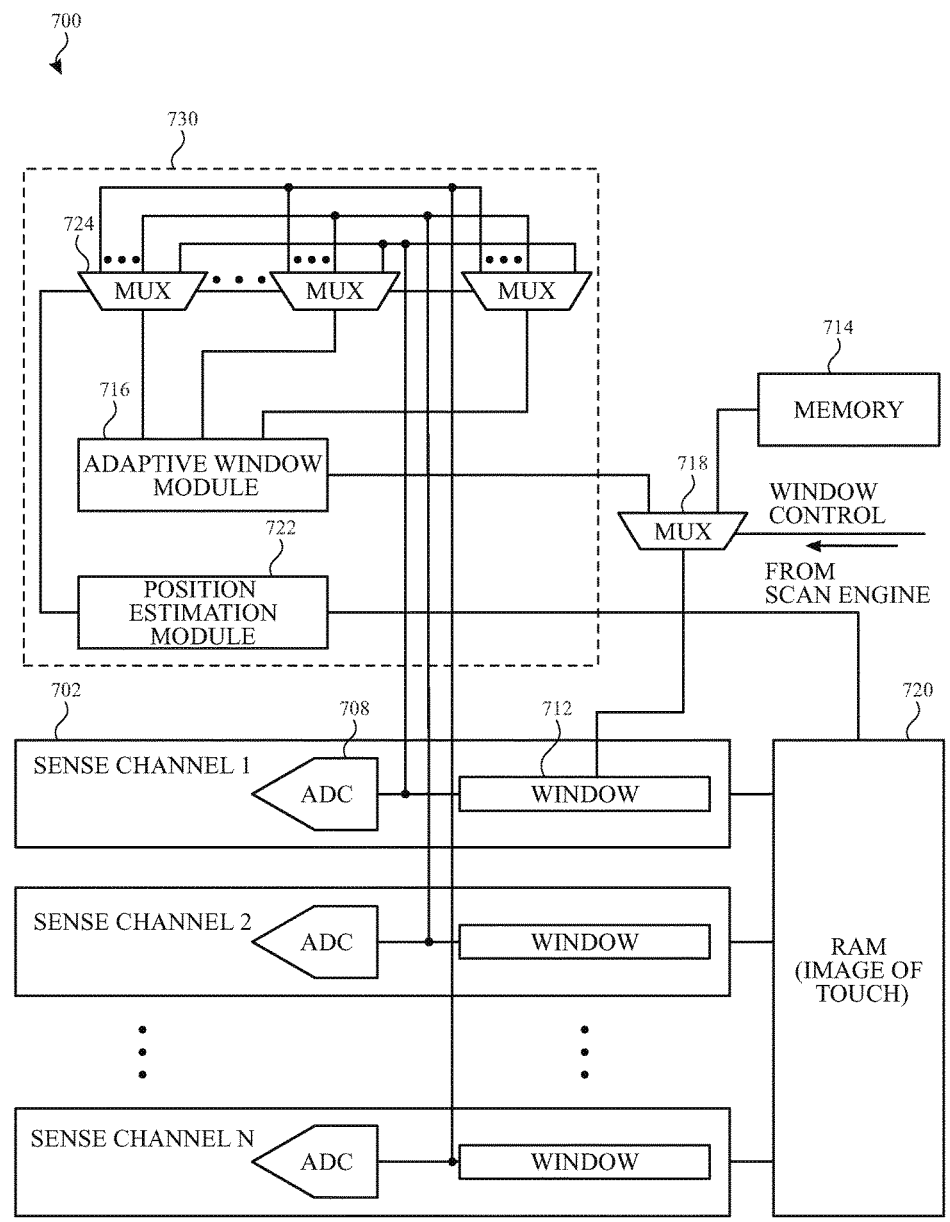
FIG. 7 illustrates a block diagram of an example system for dynamically adjusting a demodulation window based on localized input according to examples of the disclosure.

FIG. 7 illustrates a block diagram of an example system 700 for dynamically adjusting a demodulation window based on localized input according to examples of the disclosure. System 700 can include multiple sense channels 702, each of which can correspond to sense channel 602 in FIG. 6. System 700 also illustrates memory 714, adaptive window module 716 and MUX 718 which can correspond to corresponding elements in FIG. 6. For simplicity of description, the sense channels 702 are illustrated as including ADCs 708 and demodulation windows 712 and the remaining elements of sense channel 602 are omitted. Adaptive window module 716 can generate an optimized window for the multiple sense channels 702 based on ADC outputs from sense channels sensing touch sensor nodes localized to a touch event.

During touch sensing operations, output of the ADCs 708 (or some other output of sense channels 702) can be processed, including demodulation using demodulation window 712. The processed output results can represent the capacitance measurements for the touch sensor nodes measured by the corresponding sense channels. The capacitance measurements for the touch sensor panel can be stored in memory, such as RAM 720. The capacitance measurements for the sensor nodes of the touch sensor panel, taken together, can represent an image of touch. Position estimation module 722 can use the image of touch and identify a touch event corresponding to one or more objects contacting the touch sensitive surface. Position estimation module 722 can then select one or more sense channels localized to contact by one or more objects. For example, as illustrated in FIG. 7, position estimation module 722 can generate a control signal representative of a selection of sense channels localized to contact by one or more objects. The control signal can operate multiplexers (MUXs) 724 (or other switching means) to dynamically couple the ADC output of the localized sense channels to adaptive window module 716. Although three MUXs are illustrated in FIG. 7, it should be understood that the adaptive window module 716 can accept a different number of ADC outputs as inputs (e.g., 1, 5, 16, etc.). Additionally, it should be understood that although each MUX is illustrated as receiving each ADC output, it should be understood that fewer than all ADC outputs can be routed to each of the MUXs.

In some examples, when a single contact touch event is detected, the position estimation module 722 can select sense channels from sense channels localized to the single contact. The selected sense channels can represent contiguous touch sensor nodes localized to the single contact, or some other distribution (e.g., non-contiguous) of touch sensor nodes localized to the single contact. In some examples, when the touch event includes more than one contact, the sense channels can be selected from more than one contact. For example, when a two-contact touch event is detected, some of the sense channels localized to a first contact of the two-contact touch event can be selected and some of the sense channels localized to a second contact of the two-contact touch event can be selected. In some examples, even when the touch event includes more than one contact, the sensor channels can be selected from one contact. For example, when a two-contact touch event is detected, sense channels localized to one of the contacts can be selected and the sense channels localized to the second of the contacts can be not selected. In some examples, when no touch event is detected, the coupling by MUXs 724 can remain unchanged. In some examples, when no touch event is detected, a default coupling by the MUXs 724 can be employed. In some examples, when no touch event is detected, adaptive window module can be disabled, such that the window is not adapted in the absence of a touch event.

Position estimation module 722 can be implemented in hardware, firmware or software, or any combination thereof. For example, position estimation module 722 can be a hardware accelerator configured to identify a location of contact from the image of touch and select a number of sense channels at the location at which the contact is detected. In some examples, position estimation module 722 can be a processor executing a program or instructions stored on a non-transitory processor readable storage medium.

It is to be understood that system 700 is not limited to the components and configuration of FIG. 7, but can include other or additional components in multiple configurations according to various examples. Additionally, the components of computing system 700 can be included within a single device, or can be distributed between multiple devices. In some examples, adaptive window module 716, position estimation module 722 and MUXs 724 can be implemented in a chip or ASIC 730 that can be integrated into existing touch sensing systems without significant modification to existing sense channels and receive circuitry.

Figure 8:
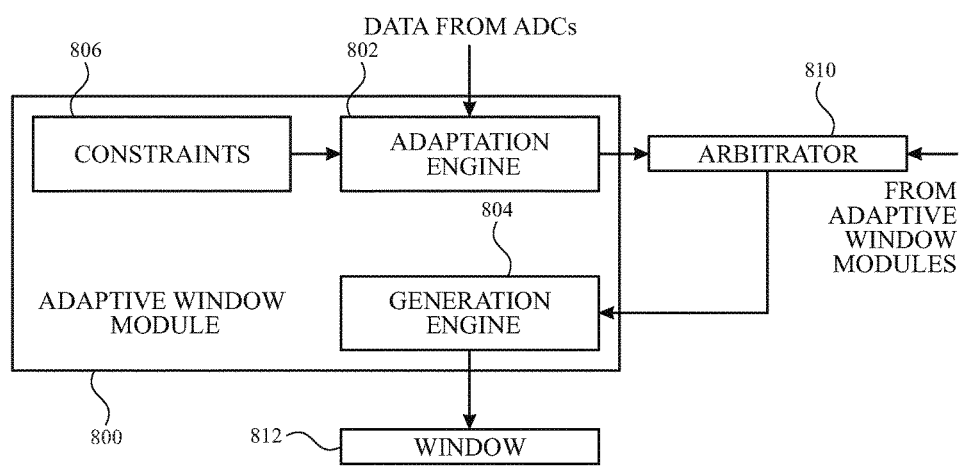
FIG. 8 illustrates a block diagram of an example adaptive window module and example arbitrator according to examples of the disclosure.

FIG. 8 illustrates a block diagram of an example adaptive window module 800 and example arbitrator 810 according to examples of the disclosure. Adaptive window module 800 can include two engines, adaptation engine 802 and generation engine 804. In order to simplify processing, the window can be represented in a compressed representation for adaptation purposes. After adaptation, the window can be generated in full from the compressed representation. For example, the full demodulation window can be represented as a vector of length N, where N can be between 100 and 10000, for example. In some examples, N can be between 500 and 2000 (e.g., 500, 1000). Processing vectors and matrices with a dimension of magnitude N can be computationally intensive and can take a considerable amount of time. Rather than processing vectors and matrices (or other representations) with a dimension of magnitude N, the adaptation performed by adaptation engine can be done with a compressed set of coefficients. For example, the full demodulation window can be projected from a space having dimension N into a compressed space having dimension M, for which processing can be easier. For example, the M for the compressed space can be between 1 and 50. In some examples, M for the compressed space can be between 5 and 15 (e.g., 10). Using M rather than N coefficients representing an adapted window can significantly reduce the processing complexity and time. For demodulation purposes, the full optimized demodulation window of length N can be reconstructed from the compressed representation of the adapted window used by the adaptation window module 800. Additionally, using the compressed representation allows for efficient communication of the adaptive window coefficients between modules.

Adaptive window module 800 can also include constraints 806 for the adaptation of an optimized window. Constraints can be stored in an updatable configuration memory, for example. The constraints can include information about known signal sources and known interferers. As an example, the constraints for optimizing the window can include passing signal at an operating frequency f1. Without such a constraint, the signal that the touch sensors are trying to detect can be attenuated. As another example, the constraints for optimizing the window can include nulling/attenuating out known interferers at a known frequency or within a range of frequencies. For example, if a known interferer exists at 80 kHz (e.g., an oscillator in the touch-sensitive device), the constraints can include nulling/attenuating out 80 kHz or a range of frequencies from 79 kHz-81 kHz, for example. It should be understood that the above example constraints are exemplary, and other conditions can be included. The constraints can be updated, for example, based on instructions from the scan engine 210. For example, if a frequency of operation changes from f1 to f2, the constraints for passing the signal can be changed to match the operating frequency. Likewise if a peripheral device such as an active stylus is enabled or hops frequency, a constraint can be added or changed to allow passing the stylus signal. Additionally, in some examples, enabling or disabling a wireless communication transmitter/receiver/transceiver could result in a change in constraints for the optimized window.

The adaptation engine 802 can receive use constraints and ADC outputs, and can generate an adapted window based thereon. The process can, for example, include least squares adaptive processing to generate the adapted window. For example, the processing can determine a window given by a vector w, subject to the linear constraints given by vectors $c_1, c_2, \ldots, c_K$ and the condition that the adapted window minimizes the energy of the set of window outputs of the noise vector sets $(n_1, n_2, \ldots, n_L)$. The constraints can be expressed mathematically as:

$$w * c_i = d_i \text{ for } 1 \le i \le L$$

where $c_i$ can represent the $i^{th}$ constraint, w can represent the window, and $d_i$ can represent the window outputs indexed to i. The constraints can be expressed mathematically as:

$$\sum_{i=1}^{N} (w * n_i)^2$$

where $n_i$ can represent the noise vectors indexed to i. The least squares processing can adapt the window such the above sum can be reduced or minimized. Although adaptive least squares processing is provided by way of example, other processing can be implemented to generate an adapted window. For example, other solutions to generate a window satisfying these conditions can include least squares, autocorrelation methods, etc.

The processing by adaptation engine 802 can be performed iteratively using multiple sample vectors of data from the ADCs. For example, during a given period, multiple spectral analysis scans (without stimulation by the transmit circuitry) can be performed to generate ADC output data corresponding to noise in the system. The window can be adapted in L iterations (each iteration corresponding to one of the sets of output data collected from the ADC output at a different time), and each iteration of the adaptation engine processing can use the additional ADC output to modify the window further to minimize the observed noise vectors at the output of the window. Though engine 802 is described as an adaptation engine, many possible variations and implementations can be possible. For example, instead of iteratively adapting the window coefficients, a noise correlation matrix could be estimates directly from the noise data, and the resulting optimal demodulation waveform could be computed using the noise correlation matrix by solving an optimization problem. Or, other adaptive algorithms could be used such as least mean squares (LMS), normalized least mean squares (NLMS), recursive least squares (RLS), and many others variants known to those skilled in the art.

Moreover, as described above, the window demodulation waveform can be compressed so that the synthesized window can be generated as a linear combination of basis functions. The different linear combination coefficients of these basis functions can result in different synthesized windows. An efficient representation of the demodulation waveform can result if the number of basis functions is smaller than the number of window taps. For example, if the number of the window taps is 200, representing the window with 10 basis functions can result in a significant reduction in storage/representation of the window. Additionally, this reduction in storage can significantly reduce the window adaptation complexity because 10 coefficient, rather than 200, can be adapted. The window adaptation mechanism could change to further take advantage of the window representation as a linear sum of basis functions as could be conceived by those skilled in the art. For example, the ADC noise vectors could be projected onto the window basis functions, thus reducing the length/dimension of the ADC noise vectors used in the adaptation algorithm. Many adaptation algorithms using the compressed representation can be possible, similar to the many algorithms described above.

In an example with one adaptive window module (e.g., as illustrated in FIG. 6), the adapted window can be passed from adaption engine 802 to generation engine 804, where the optimized window can be generated from the compressed adapted window. The optimized window generated by generation engine 804 can be used as the window for demodulation by the sense channels, illustrated schematically by window 812. Likewise, even in a system with multiple adaptive window modules, in some examples, each adaptive window module can generate its own optimized window for use in demodulation by corresponding sense channels. For example, the generation engine 804 for each adaptive window module can receive the adapted window from the corresponding adaptation engine 802 and can generate a window for use in demodulation by the corresponding sense channels.

In some examples, in a system with multiple adaptive window modules, an arbitration process can take place to select one of the adapted windows to use to generate an optimized demodulation window. For example, after multiple adapted windows are generated by adaptation engine 802 in FIG. 8 and generated by other adaptive window modules (not shown), the adapted windows (e.g., represented by compressed coefficients) can be passed to arbitrator 810. Arbitrator 810 can select one of the adapted windows received from the multiple adaptive window modules as a "winning" adapted window. The winning adapted window can be passed back to the multiple adaptive window modules so that the winning adapted window can be used to generate, at the generation engine of the multiple adaptive window modules, an optimized window based on the winning adapted window for use in demodulation by sense channels corresponding to the multiple adaptive window modules. In some examples, rather than selecting one of the adapted windows as the winner, the adapted windows can be combined by arbitrator 810 to generate a new adapted window, which can then be termed the "winning" adapted window.

Arbitrator 810 can determine the "winning" adapted window based on various heuristics. For example, the arbitrator can determine which of the adapted windows best minimizes noise (e.g., based on a residual parameter provided by adaptation engine 802 or calculated at arbitrator 810). In some examples, the adapted windows can be averaged and the adapted window closest to the average can be selected. In some examples, the arbitrator can compare the adapted windows to one another and exclude outlier adapted windows that are sufficiently different than (more than a threshold) the remaining adapted windows. The arbitrator can also compare the adapted windows with earlier adapted windows and exclude outlier adapted windows that are sufficient different than (more than a threshold) the past adapted windows. The latter heuristic can serve as a form of hysteresis for the optimized window. The above heuristics are exemplary; additional or fewer or different heuristics can be used to determine a "winning" adapted window. Additionally, the "winning" adapted window could be selected using information from other sources such as touch position data, indicating which window module/engine best matches or is closest to the current touch position. In some example, the arbitrator could take input from other modules in the system to choose the "winning" window.

In some examples, even after arbitration by arbitrator 810, one or more of the adaptive window modules can ignore the "winning" adapted window and use its own adaptive window to generate the optimized window. For example, when there is a known local noise aggressor that is not filtered out by the "winning" adapted window, the one or more adaptive window modules can ignore the "winning" adapted window, when their own adapted window can suppress the local noise aggressor.

Adaptation engine 802, generation engine 804 and arbitrator 810 can be implemented in hardware, firmware or software, or any combination thereof.

Figure 9:
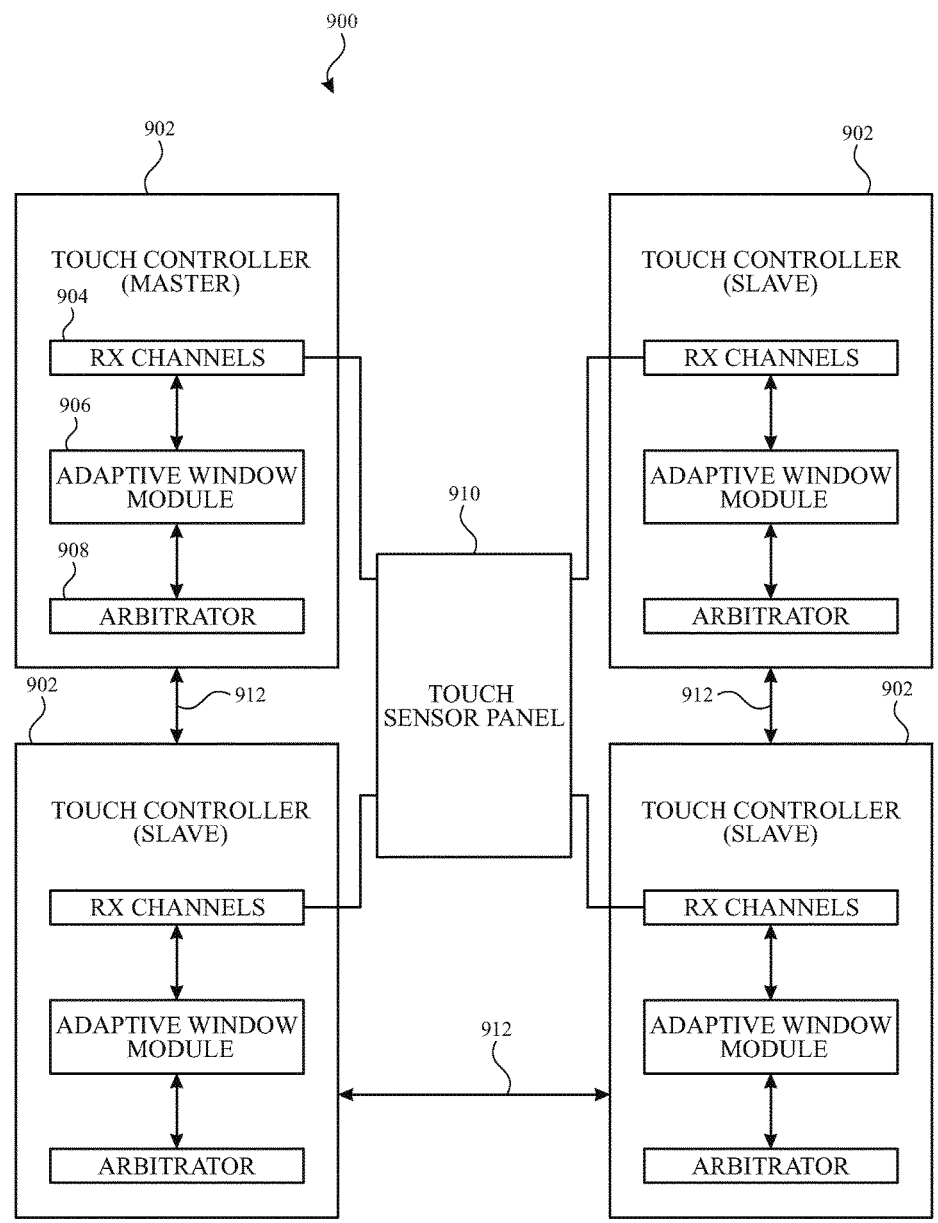
FIG. 9 illustrates an example system for dynamically adjusting a demodulation window for multiple touch controllers according to examples of the disclosure.

FIG. 9 illustrates an example system 900 for dynamically adjusting a demodulation window for multiple touch controllers according to examples of the disclosure. System 900 can include four touch controller chips 902, each of which can include sense channels 904 ("RX CHANNELS"), an adaptive window module 906 and an arbitrator 908. The touch controller chips 902 can be configured to communicate via communication channels 912, illustrated as a daisy chain configuration in FIG. 9. In other examples the touch control chips 902 can be connected in a ring configuration, connected directly to each of the other touch controller chips 902, or any other suitable configuration. One of the touch controller chips 902 can act as a master touch controller and the remaining three touch controller chips 902 can act as slave touch controllers. Each of the four touch controller chips 902 can be coupled to touch sensor panel 910.

During operation, the sense channels 904 for each touch controller chip 902 can sense their respective sensor nodes of touch sensor panel 910 and the ADC outputs can be passed to a respective adaptive window module 906. Iteratively, each adaptive window module 906 (e.g., the adaptation engine) can adjust an adapted window. The adapted window from each of the touch controller chips 902 can be transferred (via communication channels 921) to the arbitrator 908 in one or more of the touch controller chips 902. For example, at least the touch controller chip 902 designated as the master can receive the adapted windows from each of the touch controller chips 902. As described herein, the arbitrator 908 can determine a "winning" adapted window which can be communicated back to the respective adaptive window module 906 for each of the touch controller chips 902. In some examples, the arbitrator of one of the slave touch controllers rather than a master touch controller can perform the arbitration process. The adaptive window module 906 for each of the touch controller chips 902 can then generate an optimized window (or otherwise noise-tailored window) that can be used for demodulation of ADC outputs from the sense channels 904.

In some examples, the arbitrator 908 for each touch controller chip 902 can receive the adapted windows from each of the adaptive window modules 906 in system 900. Each arbitrator 908 can then perform an arbitration process to determine the "winning" adapted window. Such a configuration duplicates the arbitration function in each chip, but minimizes some data transfer requirements for the system. Additionally, as discussed above, in some examples, each touch controller chip 902 can use its own adaptive window module 906 to generate an optimized window for the sense channels 904 in the respective touch controller chip 902, without using arbitration to harmonize the optimized window between the touch controller chips 902. Additionally, as discussed above, in some examples, a touch controller chip 902 (or some sense channels therein) can ignore the "winning" adapted window chosen by arbitration if there are known noise interferers that require specific types of demodulation windows.

It is to be understood that system 900 is not limited to the components and configuration of FIG. 9, but can include other or additional components in multiple configurations according to various examples. Additionally, the components of computing system 900 can be included within a single device, or can be distributed between multiple devices. Additionally, in some examples, touch controller chips 902 can each include the same circuitry as illustrated in FIG. 9, to simplify design of a scalable touch controller chip. However, in some examples, different master and slave chips touch controller chips can be designed so as to minimize duplication of circuitry/functionality (e.g., reducing the number of arbitrators in the system).

Figure 10:
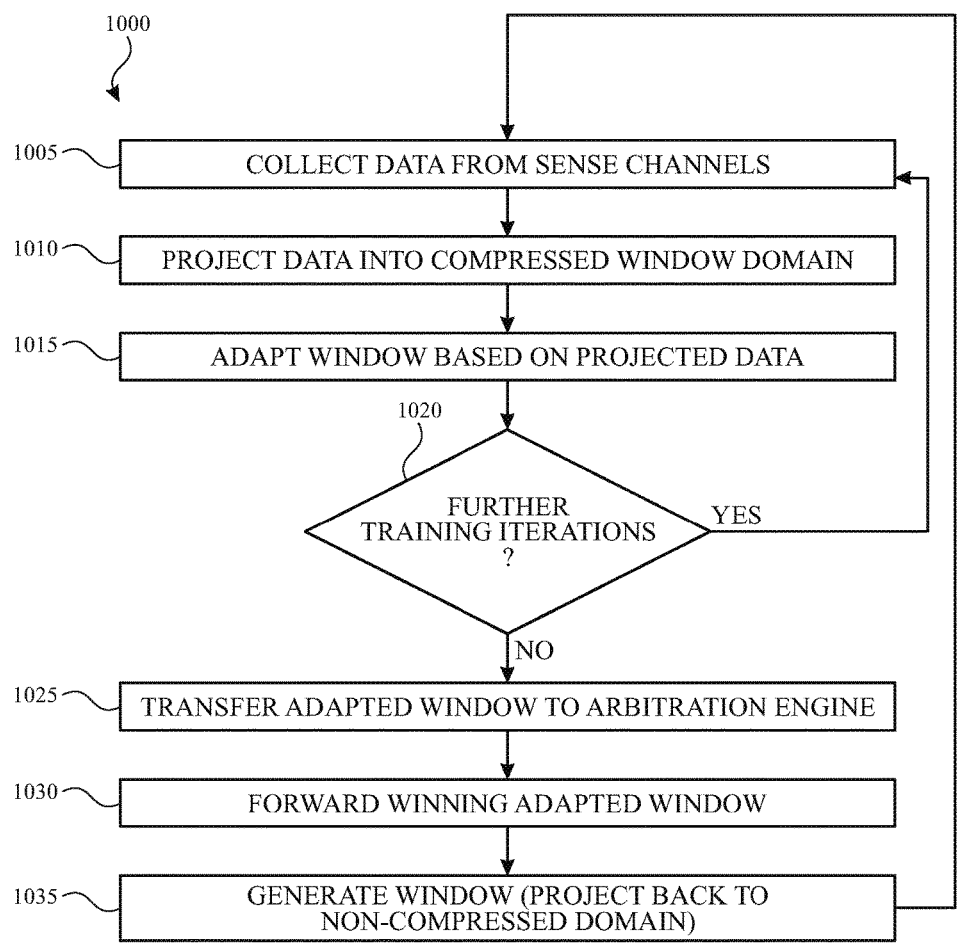
FIG. 10 illustrates an example process for generating an optimized demodulation window according to examples of the disclosure.

FIG. 10 illustrates an example process 1000 for generating an optimized demodulation window (or otherwise noise-tailored demodulation window) according to examples of the disclosure. At 1005, data can be collected from the sense channels. For example, the ADC output of one or more sense channels can be sampled. The sense channels sampled can be selected based on proximity to a contact of a detected touch event. In some examples, the sampled data can be collected during spectral analysis scans in which the touch controller is not stimulating the touch sensor panel. In some examples, the sampled data can be collected even when the touch controller is stimulating the touch sensor panel. At 1010, the sampled data can be projected into a compressed window domain (i.e., having a smaller dimension than the sampled data before compression). At 1015, in the compressed domain, the window can be adapted based on the compressed sampled data. As described above, the adapted window can be generated based on least squares processing to minimize the noise when the adapted window is applied to the compressed sampled data. Additionally, as described above, the adaptive windowing can be done iteratively based on multiple samples. At 1020, the system can determine whether further training iterations are required to adjust the adapted window. If additional samples of data are required, the process can return to collect additional data from the sense channels at 1005. If no additional samples of data are required, the adapted window can be transferred, at 1025, to an arbitration circuit or an arbitration engine. At 1030, the winning adapted window can be forwarded back to the generation engine from the arbitration engine. At 1035, the optimized window can be generated by projecting the winning adapted window back to the domain of the demodulation window.

The process of dynamically generating an optimized window can be performed continually (e.g., generating an optimized window each sensing frame or sub-frame). For example, process 1000 can occur once every sensing frame such that a new optimized window can be generated once per frame. In some examples, the process of dynamically generating an optimized window can be performed periodically (e.g., once per minute, once per hour, once per day, once per month, etc.), intermittently, or according to one or more detected conditions. In some examples, to save power, rather than optimizing the window every sensing frame, the optimized window can be optimize every other frame, every third frame or every integer N frames. In some examples, detected conditions can include disabling adaptive windowing when the system determines to use a static demodulation window and waveform, when touch events are not received for long periods of time (e.g., no touch event for 1 minute), when touch sensing is disabled (e.g., when the device is in a locked state), or when an application does not require the same noise-rejection performance level, for example.

Figure 11:
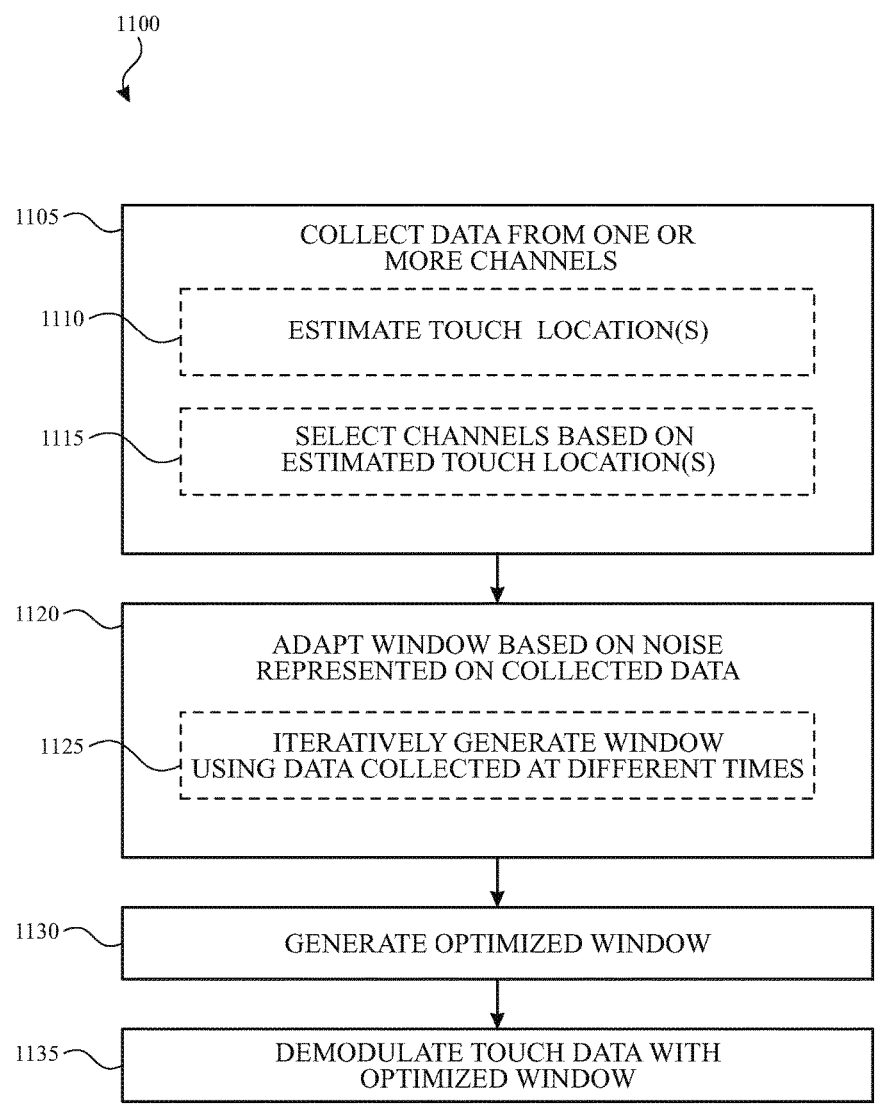
FIG. 11 illustrates an example process for generating and demodulating touch sensor panel output using an optimized demodulation window according to examples of the disclosure.

FIG. 11 illustrates an example process 1100 for generating and demodulating touch sensor panel output using an optimized demodulation window (or otherwise noise-tailored demodulation window) according to examples of the disclosure. At 1105, data can be collected from the sense channels. For example, the ADC output of one or more sense channels can be sampled. The sense channels sampled can be selected based on proximity to a contact of a detected touch event. For example, at 1110, one or more contacts by touch objects can be detected and their estimations located. At 1115, sense channels to be sampled can be selected base on the estimated touches. For example, sense channels can be selected for sense channels measuring touch sensor nodes at or in proximity to (e.g., within a threshold distance of) a contact. A window can be adapted, at 1120, based on the noise represented in the collected data. The window adaptation process can be an iterative one (1125), in which the window can be adjusted in each iteration based on data collected at different sampling times (for each iteration). At 1130, an optimized window can be generated from the adapted window. In some examples, the optimized window can be the adapted window at the conclusion of the adaption at 1120. In some examples, the optimized window can be generated by decompressing the adapted window at the conclusion of the adaptation at 1120. At 1135, the optimized window can be used to demodulate touch data in the sense channels.

Figure 12:
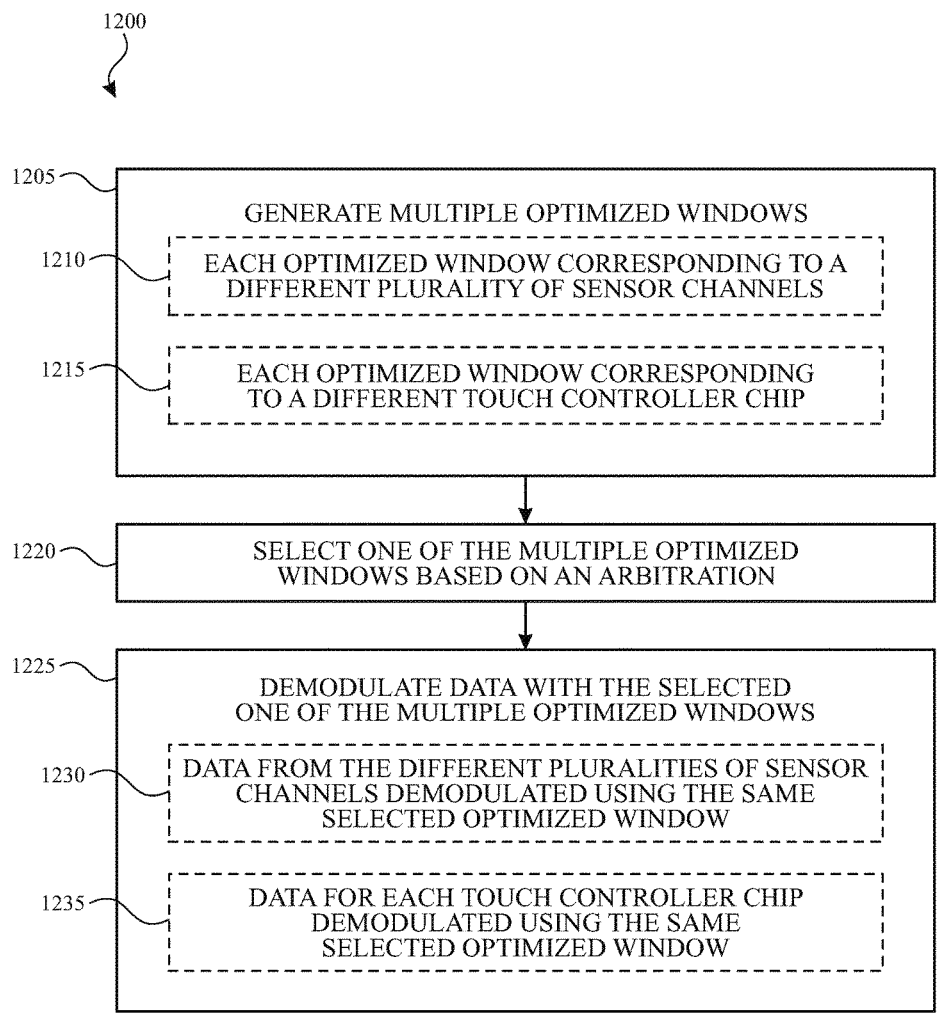
FIG. 12 illustrates an example process for using arbitration to generate an optimized demodulation window according to examples of the disclosure.

FIG. 12 illustrates an example process 1200 for using arbitration to generate an optimized demodulation window (or otherwise noise-tailored demodulation window) according to examples of the disclosure. At 1205, multiple adaptive windows can be generated. For example, the system may include multiple adaptive window modules, each configured to generate an adapted window. In some examples, each adapted window can correspond to different plurality of sense channels (1210). In some examples, each adapted window can correspond to a different touch controller chip (1215). At 1220, one of the multiple adapted windows can be selected by an arbitrator based on an arbitration process. For example, the adapted window with the smallest residuals can be selected. The winning adapted window selected by the arbitration process can be used to generate an optimized window. At 1225, the sense channels can demodulate data (e.g., from the ADC output) using the optimized window. In some examples, data from different sense channels can be demodulated using the same optimized demodulation window (1230). In some examples, data for each touch controller chip can be demodulated using the same optimized demodulation window.

Therefore, according to the above, some examples of the disclosure are directed to a touch-sensitive device comprising: a touch screen; sensing circuitry coupled to the touch screen, the sensing circuitry configured to sense a touch or near touch of an object on the touch screen (e.g., touch data), and a processor. The processor can be capable of: estimating (e.g., based on the touch data) a location of the object touching the touch screen; selecting a subset of the sense channels for the processor to sample based on the estimated location; and dynamically generating a demodulation waveform based on a noise profile sensed by the selected subset of the sense channels of the sensing circuitry during operation of the touch-sensitive device. The demodulation waveform can change responsively to changes in the noise profile. The sensing circuitry can comprise a plurality of sense channels and one or more demodulators. The one or more demodulators can be configured to demodulate the signals sensed by the plurality of sense channels using the dynamically generated demodulation waveform to generate touch data. Additionally or alternatively to one or more of the examples disclosed above, in some examples, the touch-sensitive device can further comprise switching circuitry coupled to the sensing circuitry and coupled to the processor. The switching circuitry can be operable to couple the subset of the sense channels to the processor based on the estimated location of the object touching the touch screen. Additionally or alternatively to one or more of the examples disclosed above, in some examples, the processor further capable of: dynamically adapting a demodulation window based on the noise profile; and generating a noise-tailored demodulation window based on the dynamically adjusted demodulation window. The processor can be capable of dynamically generating the demodulation waveform based on the noise profile by generating the demodulation waveform based on the noise-tailored demodulation window. Additionally or alternatively to one or more of the examples disclosed above, in some examples, the dynamically adjusted demodulation window can be compressed with respect to the noise-tailored demodulation window, and generating the noise-tailored demodulation window based on the dynamically adjusted demodulation window can comprise decompressing the dynamically adjusted demodulation window. Additionally or alternatively to one or more of the examples disclosed above, in some examples, the processor can be further capable of disabling the dynamic generation of the demodulation waveform based on one or more device conditions. Additionally or alternatively to one or more of the examples disclosed above, in some examples, the touch-sensitive device can further comprise one or more additional processors and an arbitrator. Each of the one or more additional processors can be coupled to a subset of the sensing circuitry, and each of the one or more additional processors can be capable of dynamically generating an additional demodulation window based on additional noise profiles sensed by the subset of the sensing circuitry of the corresponding one or more additional processors. The arbitrator can be coupled to the processor and the one or more additional processors. The arbitrator can be configured to select one of the demodulation window or additional demodulation windows. Additionally or alternatively to one or more of the examples disclosed above, in some examples, the demodulation waveform can be generated based on the one of the demodulation window or additional demodulation windows selected by the arbitrator.

Some examples of the disclosure are directed to an apparatus. The apparatus can comprise a plurality of sense channels and a processor coupled to the sense channels. The processor can be capable of: estimating a position of an object in contact or near contact with a touch-sensitive surface coupled to the plurality of sense channels; selecting one or more of the plurality of sense channels from which to sample noise based on at least the estimated position; dynamically sampling noise from the selected one or more of the plurality of sense channels; and dynamically generating a first demodulation window based on the dynamically sampled noise. Additionally or alternatively to one or more of the examples disclosed above, in some examples, the apparatus can further comprise switching circuitry. The switching circuitry can be configurable to dynamically couple one or more of the plurality of sense channels to the processor. Additionally or alternatively to one or more of the examples disclosed above, in some examples, the processor can be further capable of: adapting, by one or more iterations, a second demodulation window based on the dynamically sampled noise. Additionally or alternatively to one or more of the examples disclosed above, in some examples, the processor can be further capable of: generating the first demodulation window based on at least the second demodulation window. Additionally or alternatively to one or more of the examples disclosed above, in some examples, the second demodulation window can be compressed with respect to the first demodulation window, and generating the first demodulation window based on at least the second demodulation window comprises decompressing the second demodulation window. Additionally or alternatively to one or more of the examples disclosed above, in some examples, the processor can be further capable of: transferring the second demodulation window to an arbitrator; and generating the first demodulation window based on a third demodulation window received from the arbitrator. The third demodulation window received from the arbitrator can be different from the second demodulation window transferred to the arbitrator.

Some examples of the disclosure are directed to a method. The method can comprise: estimating a location of an object touching or nearly touching a touch sensitive surface of an electronic device; selecting a subset of sense channels coupled to touch sensors proximate to the estimated location of the object; sensing, during operation of the electronic device, a noise profile from the selected subset of sense channels; and dynamically generating a demodulation waveform based on the noise profile. The demodulation waveform can change responsive to changes in the noise profile. Additionally or alternatively to one or more of the examples disclosed above, in some examples, sensing the noise profile can occur during a no-stimulation scan of the touch sensitive surface. Additionally or alternatively to one or more of the examples disclosed above, in some examples, the method can further comprise: adapting a demodulation window based on the noise profile; and generating a noise-tailored demodulation window based on the adapted demodulation window. The demodulation waveform can be generated based on the noise-tailored demodulation window. Additionally or alternatively to one or more of the examples disclosed above, in some examples, generating the noise-tailored demodulation window can comprise decompressing the adapted demodulation window. Additionally or alternatively to one or more of the examples disclosed above, in some examples, adapting the demodulation window based on the noise profile can comprise compressing the noise profile. Additionally or alternatively to one or more of the examples disclosed above, in some examples, adapting the demodulation window based on the noise profile can further comprise applying least squares processing using the compressed noise profile to adapt the demodulation window. Some examples of the disclosure are directed to a non-transitory computer readable storage medium storing one or more programs, the one or more programs comprising instructions, which when executed by an electronic device including one or more processors, can cause the electronic device to perform any of the above methods.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A touch-sensitive device comprising:
a touch screen;
sensing circuitry coupled to the touch screen, the sensing circuitry configured to sense a touch or near touch of an object on the touch screen, the sensing circuitry comprising a plurality of sense channels; and
a processor programmed to:
estimate a location of the object touching the touch screen;
select a subset of the sense channels for the processor to sample based on the estimated location;
determine a noise profile sensed by the selected subset of the sense channels of the sensing circuitry during operation of the touch-sensitive device; and
generate a demodulation waveform based on the noise profile sensed by the selected subset of the sense channels of the sensing circuitry, wherein the demodulation waveform changes responsive to changes in the noise profile.

2. The touch-sensitive device of claim 1, further comprising switching circuitry coupled to the sensing circuitry and coupled to the processor, the switching circuitry operable to couple the subset of the sense channels to the processor based on the estimated location of the object touching the touch screen.

3. The touch-sensitive device of claim 1, the processor further programmed to:
dynamically adapt a demodulation window based on the noise profile; and
generate a noise-tailored demodulation window based on the dynamically adapted demodulation window;
wherein the processor is programmed to generate the demodulation waveform based on the noise profile by generating the demodulation waveform based on the noise-tailored demodulation window.

4. The touch-sensitive device of claim 3, wherein the dynamically adapted demodulation window is compressed with respect to the noise-tailored demodulation window, and generating the noise-tailored demodulation window based on the dynamically adapted demodulation window comprises decompressing the dynamically adapted demodulation window.

5. The touch-sensitive device of claim 1, wherein the processor is further programmed to disable the dynamic generation of the demodulation waveform based on one or more device conditions.

6. The touch-sensitive device of claim 3, further comprising:
one or more additional processors, each of the one or more additional processors coupled to a subset of the sensing circuitry, each of the one or more additional processors programmed to dynamically generate an additional demodulation window based on additional noise profiles sensed by the subset of the sensing circuitry of the corresponding one or more additional processors; and
an arbitrator coupled to the processor and the one or more additional processors, the arbitrator configured to select one of the demodulation window or additional demodulation windows.

7. The touch-sensitive device of claim 6, wherein the demodulation waveform is generated based on the one of the demodulation window or additional demodulation windows selected by the arbitrator.

8. An apparatus comprising:
a plurality of sense channels; and
a processor coupled to the sense channels and programmed to:
estimate a position of an object in contact or near contact with a touch-sensitive surface coupled to the plurality of sense channels;

select one or more of the plurality of sense channels from which to sample noise based on at least the estimated position;

dynamically sample noise from the selected one or more of the plurality of sense channels; and dynamically generate a first demodulation window based on the dynamically sampled noise.

9. The apparatus of claim 8, further comprising switching circuitry, the switching circuitry configurable to dynamically couple one or more of the plurality of sense channels to the processor.

10. The apparatus of claim 8, the processor further programmed to:

adapt, by one or more iterations, a second demodulation window based on the dynamically sampled noise.

11. The apparatus of claim 10, the processor further programmed to:

generate the first demodulation window based on at least the second demodulation window.

12. The apparatus of claim 11, wherein the second demodulation window is compressed with respect to the first demodulation window, and generating the first demodulation window based on at least the second demodulation window comprises decompressing the second demodulation window.

13. The apparatus of claim 10, the processor further programmed to:

transfer the second demodulation window to an arbitrator; and generate the first demodulation window based on a third demodulation window received from the arbitrator, wherein the third demodulation window received from the arbitrator is different from the second demodulation window transferred to the arbitrator.

14. A method comprising:

estimating a location of an object touching or nearly touching a touch sensitive surface of an electronic device;

selecting a subset of sense channels coupled to touch sensors proximate to the estimated location of the object;

determining, during operation of the electronic device, a noise profile sensed by the selected subset of the sense channels; and generating a demodulation waveform based on the noise profile, wherein the demodulation waveform changes responsive to changes in the noise profile.

15. The method of claim 14, wherein sensing the noise profile occurs during a no-stimulation scan of the touch sensitive surface.

16. The method of claim 14, further comprising:

adapting a demodulation window based on the noise profile; and generating a noise-tailored demodulation window based on the adapted demodulation window;

wherein the demodulation waveform is generated based on the noise-tailored demodulation window.

17. The method of claim 16, wherein generating the noise-tailored demodulation window comprises decompressing the adapted demodulation window.

18. The method of claim 16, wherein adapting the demodulation window based on the noise profile comprises compressing the noise profile.

19. The method of claim 18, wherein adapting the demodulation window based on the noise profile further comprises applying least squares processing using the compressed noise profile to adapt the demodulation window.

20. A non-transitory computer readable storage medium storing one or more programs, the one or more programs comprising instructions, which when executed by an electronic device including one or more processors, causes the electronic device to perform a method comprising:

estimating a location of an object touching or nearly touching a touch sensitive surface of the electronic device;

selecting a subset of sense channels coupled to touch sensors proximate to the estimated location of the object;

determining, during operation of the electronic device, a noise profile from the selected subset of sense channels; and generating a demodulation waveform based on the noise profile, wherein the demodulation waveform changes when the noise profile changes.

21. The non-transitory computer readable storage medium of claim 20, wherein sensing the noise profile occurs during a no-stimulation scan of the touch sensitive surface.

22. The non-transitory computer readable storage medium of claim 20, further comprising:

adapting a demodulation window based on the noise profile; and generating a noise-tailored demodulation window based on the adapted demodulation window;

wherein the demodulation waveform is generated based on the noise-tailored demodulation window.

23. The non-transitory computer readable storage medium of claim 22, wherein generating the noise-tailored demodulation window comprises decompressing the adapted demodulation window.

24. The non-transitory computer readable storage medium of claim 20, wherein adapting the demodulation window based on the noise profile comprises compressing the noise profile.

25. The non-transitory computer readable storage medium of claim 24, wherein adapting the demodulation window based on the noise profile further comprises applying least squares processing using the compressed noise profile to adapt the demodulation window.

* * * * *